(12) United States Patent
Hazell et al.

(10) Patent No.: US 6,429,966 B1
(45) Date of Patent: Aug. 6, 2002

(54) MULTISTAGE OPTICAL AMPLIFIER WITH RAMAN AND EDFA STAGES

(75) Inventors: Neville Hazell, West Wickham; Shan Xue-Kang, London; Derek Willetts, Dartford, all of (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/572,577

(22) Filed: May 17, 2000

(30) Foreign Application Priority Data

May 19, 1999 (GB) .............................................. 9911665

(51) Int. Cl.$^7$ ................................................ H01S 3/00

(52) U.S. Cl. ................................... 359/341.41; 359/334

(58) Field of Search ........................... 372/3; 359/337.4, 359/341.41, 341.42, 341.1, 334, 341.33

(56) References Cited

U.S. PATENT DOCUMENTS

| | | | | |
|---|---|---|---|---|
| 4,699,452 A | * | 10/1987 | Mollenauer | 350/96.16 |
| 5,058,974 A | * | 10/1991 | Mollenauer | 385/27 |
| 5,696,615 A | | 12/1997 | Alexander | 359/134 |
| 5,742,427 A | | 4/1998 | Kakui et al. | 359/341 |
| 5,835,259 A | | 11/1998 | Kakui et al. | 359/341 |
| 6,088,152 A | * | 7/2000 | Berger et al. | 359/334 |
| 6,091,541 A | * | 7/2000 | Yoon | 359/341 |
| 6,172,803 B1 | * | 1/2001 | Masuda et al. | 359/341 |
| 6,191,877 B1 | * | 2/2001 | Chraplyvy et al. | 359/124 |

FOREIGN PATENT DOCUMENTS

| | | | | |
|---|---|---|---|---|
| EP | 0 851 543 A2 | | 7/1998 | H01S/3/06 |
| JP | 2001015845 A | * | 1/2001 | H01S/3/30 |
| JP | 2001109025 A | * | 4/2001 | G02F/1/35 |
| WO | WO 98/15042 | | 4/1998 | H01S/3/30 |
| WO | WO98/36479 | * | 8/1998 | H01S/3/10 |

OTHER PUBLICATIONS

Leroy et al., "32 × 10 Gbit/s transmission over 8000 km using hybrid Raman–Erbium doped fiber optical amplifiers", Optical Fiber Communication Conference, Mar. 7–10, 2000, vol. 1, pp. 143–145.*
Emori et al. "Cost–Effective Depolarized Diode Pump Unit Designed for C–band flat–gain Raman Amplifiers to Control EDFA Gain Profile", Optical Fiber Communication Conference, Mar. 7–10, 2000, Vo. 4, pp. 106–108.*
Srivastava et al. "System Margin Enhancement with Raman Gain in Multi–Span WDM Transmission", OFC '99 Technical Digest, Feb. 26, 1999, pp. 53–55.*
Emori et al. "100nm bandwidth flat gain Raman amplifiers pumped and gain–equalized by 12–wavelength–channel WDM high power laser diodes", Optical Fiber Communication Conference, Feb. 21–26, 1999, pp. PD19/1–PD19/3 Suppl.*
Masuda et al. "Wide–Band and Gain–Flattened Hybrid Fiber Amplifier Consisting of an EDFA and a Multiwavelength Pumped Raman Amplifier". IEEE Photonics Technology Letters, vol. 11, No. 6, Jun. 1999.*

* cited by examiner

*Primary Examiner*—Thomas H. Tarcza
*Assistant Examiner*—Deandra M. Hughes
(74) *Attorney, Agent, or Firm*—Sughrue Mion, PLLC

(57) ABSTRACT

The present invention provides an optical amplifier for a wavelength division multiplexed communication system, including a first amplifier stage responsive to changes in gain to cause a wavelength dependent gain tilt in one direction. a second amplifier stage (3) responsive to corresponding changes in gain to cause a wavelength dependent gain tilt in an opposite direction and gain control means (4) for controlling the gain of the first (2) and second (3) amplifier stages to maintain a substantially flat response for the amplifier (1) over time, in which the first amplifier stage (2) is a length of optical transmission fibre providing a Raman amplifier. The present invention provides an optical amplifier which uses dynamic gain tilt adjustment whilst maintaining a constant output level from the amplifier.

23 Claims, 4 Drawing Sheets

MULTISTAGE OPTICAL AMPLIFIER WITH RAMAN AND EDFA STAGES

FIELD OF THE INVENTION

The present invention relates to an optical amplifier and in particular an optical amplifier suitable for use in a Wavelength Division Multiplexed (WDM) communications network.

BACKGROUND OF THE INVENTION

In optically amplified WDM communications systems, to achieve acceptable signal-to-noise ratios (SNR) for all WDM channels it is necessary to have a constant value of gain for an to optical amplifier irrespective of the wavelength of any particular input channel. This is known as gain flatness and is defined as a low or zero value of the rate of change of gain with respect to wavelength at a fixed input level. Conventional amplifiers achieve gain flatness by careful design of Erbium Doped Fibre Amplifiers (EDFAs) and with the use of gain flattening filters. In addition, to ensure a constant output level from an optical amplifier when the input level changes most optical amplifiers also include an Automatic Level Control (ALC) circuit to adjust the gain by controlling the pump level. However. when the pump level is adjusted, the gain flatness of the amplifier is adversely affected exacerbating or introducing a gain tilt to the EDFA.

Fixed gain flattening filters may be used to address this problem. However, input level changes can be caused by cable ageing, cable repair or a fault in another EDFA in the amplifier. all of which may vary with time. Fixed gain flattening filters can not compensate the gain tilt changes that are caused by these variations. Alternative methods have been proposed to provide dynamic gain tilt adjustment, for example, making use of a variable gain equaliser or using an external attenuator coupled to the input of the EDFA. However, these devices are expensive and lead to an inevitable loss of gain of the amplifier over time.

SUMMARY OF THE INVENTION

According to a first aspect of the present invention, an optical amplifier for a wavelength division multiplexed communications system, comprises:

a first amplifier stage responsive to changes in gain to cause a wavelength dependent gain tilt in one direction:

a second amplifier stage responsive to corresponding changes in gain to cause a wavelength dependent gain tilt in an opposite direction; and, gain control means for controlling the gain of the first and second amplifier stages to maintain a substantially flat response for the amplifier over time in which the first amplifier stage is a length of optical transmission fibre providing a Raman amplifier.

The present invention provides an optical amplifier which uses dynamic gain tilt adjustment whilst maintaining a constant output level from the amplifier. As such, the amplifier is particularly suitable for use in an optical repeater in a submarine communications network in which changes in the input level can occur as a result of many unpredictable factors as discussed above.

Preferably, the gain control means comprises a signal processing circuit coupled to an output of the optical amplifier arranged to detect changes in output level of the amplifier and adjust the gains of the first amplifier stage and the second amplifier stage accordingly and the signal processing circuit comprises a pump control circuit arranged in a negative feedback control loop around at least one amplifier stage. such that when a decrease in output level of the amplifier is detected the gains of the first amplifier stage and the second amplifier stage are adjusted accordingly to maintain the output of the amplifier at a substantially constant level.

As well as maintaining the output level of the amplifier at a constant level, the gain tilt of the amplifier with respect to input signal wavelength is maintained as substantially flat.

Preferably, the gain control means comprises at least one pump source arranged to provide pump light to the first amplifier stage and to the second amplifier stage, the power of the pump light being controlled in dependence on the output level of the amplifier.

More preferably, the amplifier further comprises an optical splitter arranged to couple a predetermined proportion of the pump light to the first amplifier stage thereby causing a wavelength dependent gain tilt in a first direction and a predetermined proportion of the pump light to the second amplifier stage thereby causing a wavelength dependent gain tilt in an opposite direction.

The overall increase in gain of the amplifier which is required can be provided by an increment in gain of the first amplifier stage and an increment in gain of the second amplifier stage. Therefore. the output level of the amplifier will be maintained and no undesired gain tilt will be introduced into the amplifier response.

According to a second aspect of the present invention, an optical repeater for a submarine communications system comprises an optical amplifier according to the first aspect of the present Invention.

According to a third aspect of the present invention, a submarine communications system comprises at least one optical repeater according to the second aspect of the present invention.

BRIEF DESCRIPTION OF THE DRAWINGS

An example of the present invention will now be described in detail with reference to the accompanying drawings, in which.

DETAILED DESCRIPTION

Figure 1:
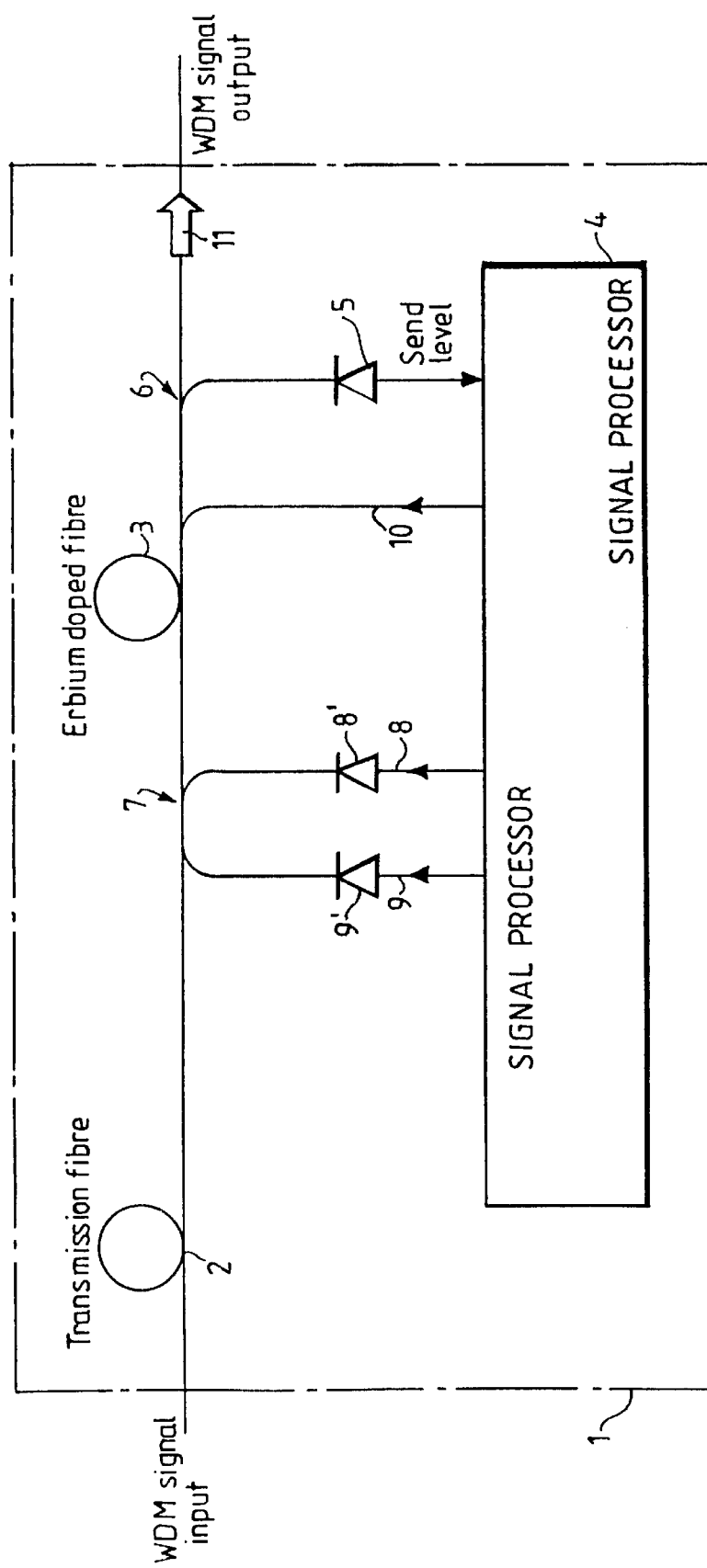
FIG. 1 shows a block diagram of an optical amplifier according to the present invention.

FIG. 1 shows a block diagram of an example of an optical amplifier according to the present invention. The amplifier 1 has a length of transmission fibre 2 providing a Raman amplifier stage and an EDFA 3 connected in series. A photodetector 5 in a feedback loop in the amplifier detects a Send Level output of an optical signal propagating through the amplifier 1 and couples the detected level to the signal processing circuit 4 via a coupler 6. The amplifier 1 also includes pump sources (not shown) for pumping each of the transmission fibre 2 and the EDFA 3 via a WDM coupler 7. In this example, the pump sources are contained within the signal processing circuit 4. The pump light is provided from the pump sources via connections 8, 9 and 10 between the signal processing circuit 4 and the transmission fibre 2 and the EDFA 3. Connections 8 and 9 include optical isolators 8' and 9'. An optical isolator 11 is provided at the output of the amplifier 1.

Figure 2:
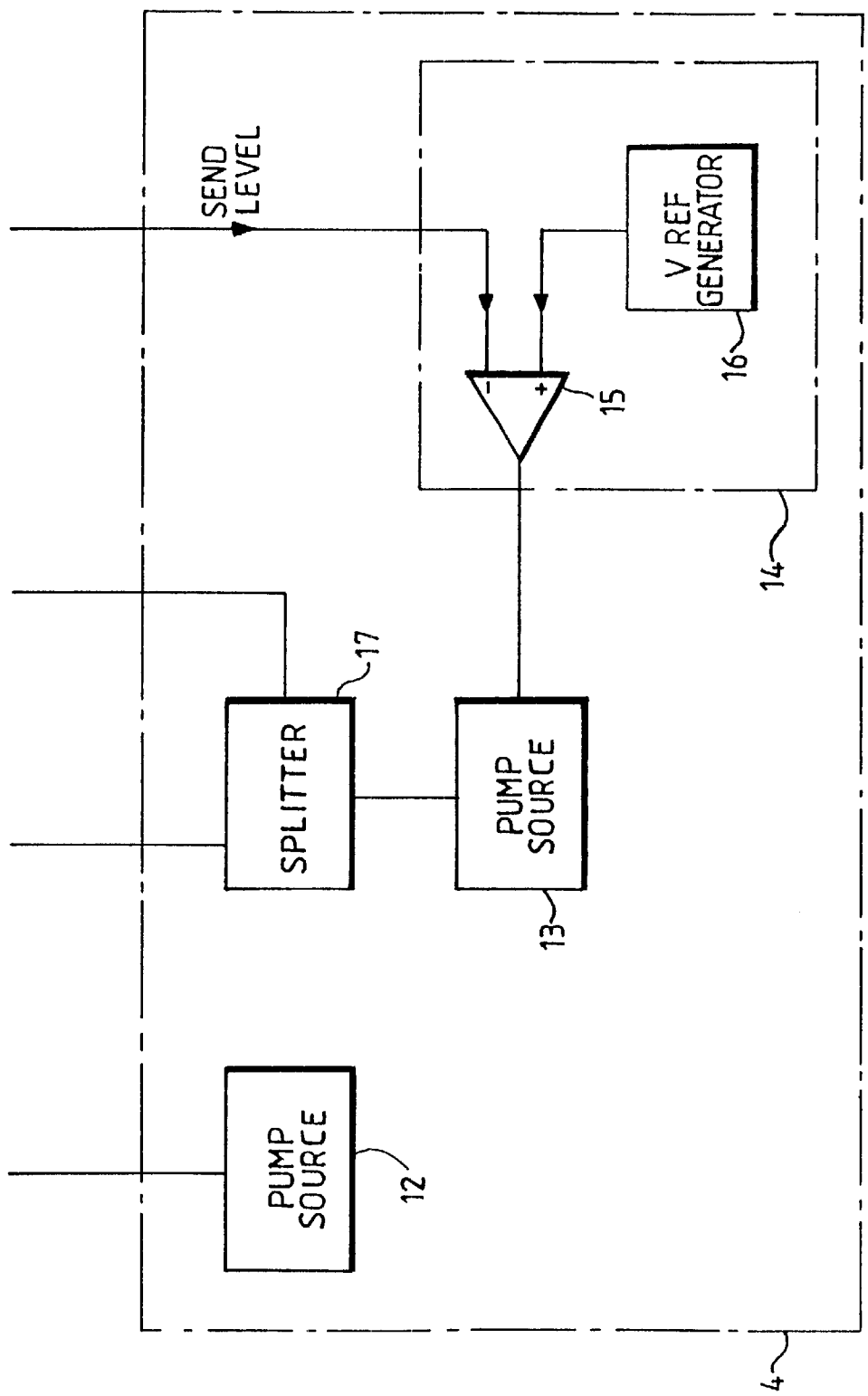
FIG. 2 shows a block diagram of a signal processing circuit suitable for use in the optical amplifier shown in FIG. 1.

FIG. 2 shows a block diagram of a signal processing circuit 4 suitable for use in the optical amplifier shown in FIG. 1. The signal processing circuit 4 has a pump source 12 arranged to co-pump the EDFA 3 at a wavelength of 980 nm and a pump source 13 arranged to counter-pump the EDFA 3 and the Raman amplifier stage 2 at a wavelength of 1475 nm. The pump level source 12 is set at a constant value whereas, as will be described below, the pump level of pump source 13 is variable in dependence on the detected Send Level output of amplifier 1. The signal processing circuit 4 also has an ALC unit 14 having a comparator 15 arranged in a negative feedback control loop. The Send Level output from the amplifier 1 and a voltage reference signal from a voltage reference signal generator 16 are used as inputs to the comparator 15. The output from the comparator 15 is used as an error signal to control the pump level of pump source 13 in that a change in the error signal will cause a corresponding change in the pump level of pump source 13. By setting the voltage reference signal at a desired level, the output of the comparator 15 and hence the Send Level output of the amplifier 1 can be controlled.

A splitter 17 is arranged to split the output from pump source 13, a predetermined proportion of the total output power of pump source 13 being used to counter-pump each of the EDFA 3 and the transmission fibre 2. As will be described below. the ratio of the split may be set independently in accordance with a user's needs.

The operation of the amplifier 1 will now be described with reference to FIGS. 1 and 2. When the input level to the amplifier 1 decreases from a nominal value this would ordinarily lead to a corresponding decrease in the Send Level output of the amplifier 1. In this case, when the Send Level output decreases the output from comparator 15 increases thereby increasing the pump level of pump source 13. However, increasing the pump level supplied to the EDFA 3 causes a clockwise gain tilt in the output of the EDFA 3 (shorter wavelengths will experience higher gain than longer wavelengths (see FIG. 2)). Typically, for a 10 dB EDFA the gain tilt will be of the order of 0.2 dB/dB over a 12 nm wavelength range. Therefore. to compensate for this change in gain tilt. the transmission fibre 2 is also counter-pumped by pump source 13 to provide an amount of Raman amplification. In contrast to the clockwise gain tilt change caused by the EDFA 3, WDM signals in the range 1548 to 1560 nm will see a counterclockwise gain tilt when the Raman gain increases (see FIG. 4). Typically. the transmission fibre 3 can have a Raman gain of the order of 440 cm$^{-i}$ which is about 100–110 nm for a 1480 nm pump. The change in gain tilt will be of the order of 0.3 dB/dB. Therefore it is possible to compensate the change in gain tilt in the EDFA using the opposite change in gain tilt of the Raman gain of the transmission fibre.

When there is a reduction in the input level to the amplifier 1, the extra gain which is needed to maintain the output level of the amplifier at a constant value is jointly provided by an increment in the gain of the EDFA 3 and an increment in the gain of the Raman amplifier in the transmission fibre 2. The overall change in gain tilt of the amplifier 1 is therefore minimised.

In use, part of the optical output of amplifier 1 is directed into a negative feedback control loop as the Send Level output via photodetector 5 to the signal processing circuit 4. The voltage reference signal generator 16 provides a voltage reference signal Vref to the positive terminal of comparator 15. the Send Level output from photodetector 5 being coupled to the negative terminal of comparator 15. As the Send Level output drops, usually in response to a decrease in input level to the amplifier 1, the negative feedback control loop serves to increase the pump level supplied by pump source 13 thereby increasing the respective gains of the Raman amplifier 2 and the EDFA 3.

The output of pump source 13 is coupled to the splitter 17 which ensures that the pump levels of EDFA 3 and Raman amplifier 2 are simultaneously adjusted in accordance with the Send Level output changes to ensure that the gain tilt of the amplifier 1 remains flat. For example, if a decrease in the Send Level output of 3 dB is detected by the signal processing circuit 4, a corresponding 3 dB increase in the gain of the amplifier 1 will be required to maintain the Send Level output at a constant level. To achieve this, the gain of the EDFA 3 may be increased by 1.8 dB and the gain of the Raman amplifier 2 may be increased by 1.2 dB. The proportions of power from the pump source 13 supplied to each of the EDFA 3 and the Raman amplifier stage 2 are set by the splitter 17 and are determined in accordance with a user's needs. As such. the Send Level output of the amplifier 1 will be maintained at a constant level whilst simultaneously ensuring that the gain tilt of the amplifier 1 will also remain substantially flat.

Figure 3:
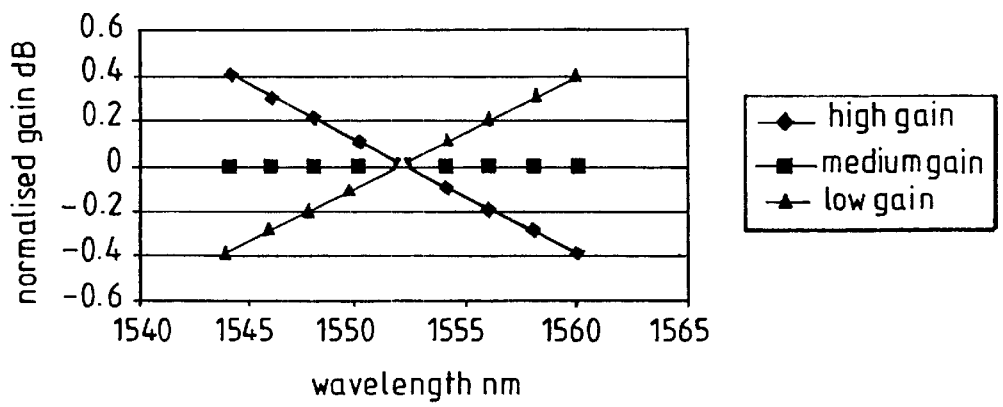
FIG. 3 shows a graph of normalised gain of an EDFA against wavelength of the input signal.
Figure 4:
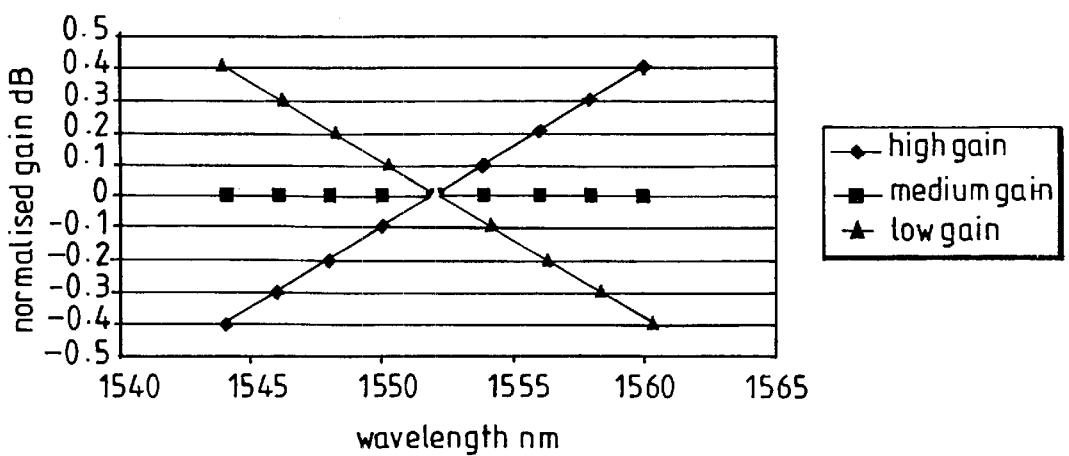
FIG. 4 shows a graph of normalised gain of a Raman amplifier against wavelength of the input signal.

FIGS. 3 and 4 show graphs of normalised gain of an EDFA and a Raman amplifier respectively against wavelength of an input signal. The graphs show how over a wavelength range of 1544 nm to 1560 nm the gain tilt of the EDFA changes. At a low value of the gain, the gain tilt is positive, whereas at a high value of the gain the gain tilt is negative. In contrast to this. for the Raman gain in the transmission fibre, for a low value of gain the gain tilt is negative whereas for a high value of gain the gain tilt is positive.

Figure 5:
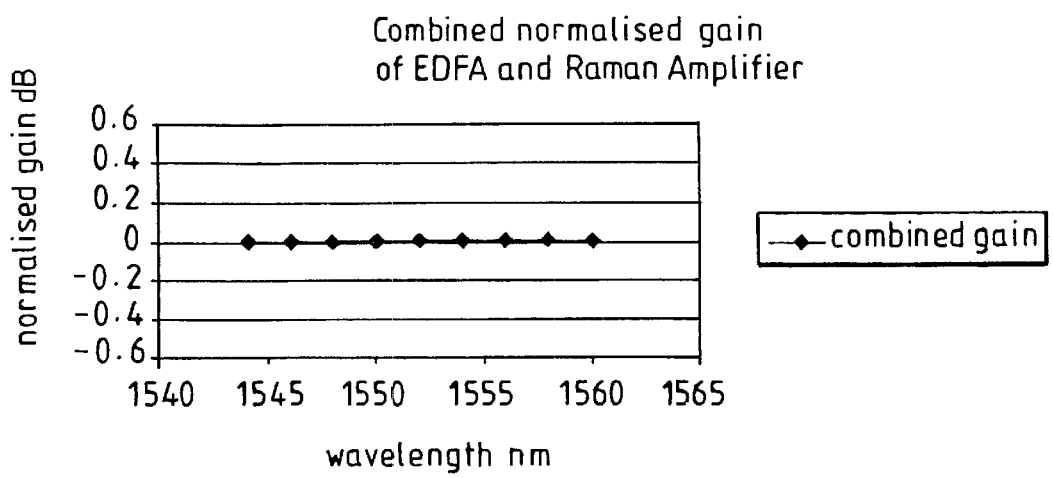
FIG. 5 shows a graph of combined normalised gain of an EDFA and a Raman amplifier against wavelength of the input signal; and, FIG. 6 shows a communications network having a number of repeaters having an amplifier according to the present invention.

FIG. 5 shows a graph of combined normalised gain of an EDFA and a Raman amplifier against wavelength of the input signal. By combining the effects as shown in the graphs of FIGS. 3 and 4, a constant flat gain tilt over a range of 1544 to 1560 nm is obtained.

Figure 6:
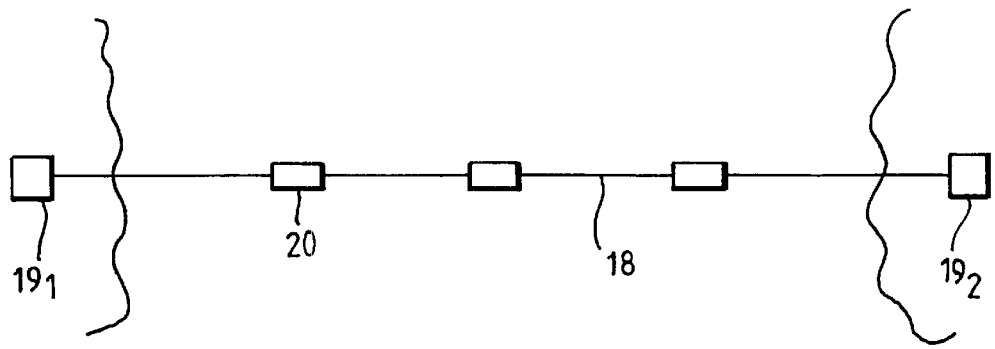

FIG. 6 shows a submarine communications network having a number of optical repeaters 20 each incorporating a number of optical amplifiers according to the present invention. The network has a submarine cable 18 linking first and second endstations $19_1$ and $19_2$ via a number of such optical repeaters 20. The output level of each of the optical repeaters 20 can be determined by setting an appropriate value for the reference voltage signal Vref in the respective signal processor. Since each of the repeaters includes optical amplifiers according to the present invention, relative channel levels of WDM signals in each optical fibre in the submarine cable will be maintained over the entire link.

We claim:

1. An optical amplifier for a wavelength division multiplexed communications system, comprising:
   a first amplifier stage responsive to changes in gain to cause a wavelength dependent gain tilt in one direction;
   a second amplifier stage responsive to corresponding changes in gain to cause a wavelength dependent gain tilt in an opposite direction; and,
   a gain controller controlling the gain of the first and second amplifier stages to maintain a substantially flat response for the amplifier, in which the first amplifier stage is a length of optical transmission fibre providing a Raman amplifier, said gain controller comprising a signal processing circuit coupled to an output of the optical amplifier and arranged to detect changes in the output level of the amplifier and adjust the gain of the first amplifier stage and the second amplifier stage accordingly.

2. An optical amplifier according to claim 1 in which the signal processing circuit comprises a pump control circuit arranged in a negative feedback control loop around at least one amplifier stage, such that when a decrease in output level of the amplifier is detected the gains of the first amplifier stage and the second amplifier stage are adjusted accordingly to maintain the output of the amplifier at a substantially constant level.

3. An optical amplifier according to claim 1, in which the second amplifier stage is an Erbium Doped Fibre Amplifier.

4. An optical amplifier according to claim 1, in which the gain controller comprises at least one pump source arranged to provide pump light to the first amplifier stage and to the second amplifier stage, the power of the pump light being determined in dependence on the output level of the amplifier.

5. An optical amplifier according to claim 4, comprising an optical splitter arranged to couple a predetermined proportion of the pump light to the first amplifier stage thereby causing a wavelength dependent gain tilt in a first direction and a predetermined proportion of the pump light to the second amplifier stage thereby causing a wavelent dependent gain tilt in an opposite direction.

6. An optical amplifier according to claim 5, in which the gain controller comprises two pump sources in which a first pump source is arranged to counter-pump the first amplifier stage and the second amplifier stage, and a second pump source is arranged to co-pump one of the first amplifier stage and the second amplifier stage.

7. An optical repeater for a submarine communications system comprising an optical amplifier according to claim 1.

8. A submarine communication system comprising at least one optical repeater according to claim 7.

9. An optical amplifier for a wavelength division mtlti-plexed communications system, comprising:
   a first amplifier stage responsive to changes in gain to cause a wavelength dependent gain tilt in one direction;
   a second amplifier stage responsive to corresponding changes in gain to cause a wavelength dependent gain tilt in an opposite direction; and,
   a gain controller controlling the gain of the first and second amplifier stages to maintain a substantially flat response for the amplifier, in which the first amplifier stage is a length of optical transmission fibre providing a Raman amplifier and the second amplifier stage is an Erbium Doped Fibre Amplifier, the gain controller comprising a signal processing circuit coupled to an output of the optical amplifier and arranged to detect changes in the output level of the amplifier and at least one pump source arranged to provide pump light to the first amplifier stage and to the second amplifier stage, the power of the pump light being determined in dependence on the output level of the amplifier.

10. An optical amplifier according to claim 9, in which the signal processing circuit comprises a pump control circuit arranged in a negative feedback control loop around at least one amplifier stage, such that when a decrease in output level of the amplifier is detected the gains of the first amplifier stage and the second amplifier stage are adjusted accordingly to maintain the output of the amplifier at a substantially constant level.

11. An optical amplifier according to claim 9, comprising an optical splitter arranged to couple a predetermined proportion of the pump light to the first amplifier stage thereby causing a wavelength dependent gain tilt in a first direction and a predetermined proportion of the pump light to the second amplifier stage thereby causing a wavelength dependent gain tilt in an opposite direction.

12. An optical amplifier according to claim 11, in which the gain controller comprises two pump sources in which a first pump source is arranged to counter-pump the first amplifier stage and the second amplifier stage, and a second pump source is arranged to co-pump one of the first amplifier stage and the second amplifier stage.

13. An optical repeater for a submarine communications system comprising an optical amplifier according to claim 9.

14. A submarine communications system comprising at least one optical repeater according to claim 13.

15. An optical amplifier for a wavelength division multiplexed communications system, comprising:
   a first amplifier stage responsive to changes in gain to cause a wavelength dependent gain tilt in one direction;
   a second amplifier stage responsive to corresponding changes in gain to cause a wavelength dependent gain tilt in an opposite direction; and,
   a gain controller controlling the gain of the first and second amplifier stages to maintain a substantially flat response for the amplifier in which the first amplifier stage is a length of optical transmission fibre providing a Raman amplifier and the second amplifier stage is an Erbium Dobed Fibre Amplifier, the gain controller comprising a signal processing circuit coupled to an output of the optical amplifier and arranged to detect changes in the output level of the amplifier, at least one pump source arranged to provide pump light to the first amplifier stage and to the second amplifier stage, the power of the pump light being determined in dependence on the output level of the amplifier and an optical splitter arranged to couple a predetermined proportion of the pump light to the first amplifier stage thereby causing a wavelength dependent gain tilt in a first direction and a predetermined proportion of the pump light to the second amplifier stage thereby causing a wavelength dependent gain tilt in an opposite direction.

16. An optical amplifier according to claim 15, in which the signal processing circuit comprises a pump control circuit arranged in a negative feedback control loop around at least one amplifier stage, such that when a decrease in output level of the amplifier is detected the gains of the first amplifier stage and the second amplifier stage are adjusted accordingly to maintain the output of the amplifier at a substantially constant level.

17. An optical amplifier according to claim 15, in which the gain controller comprises two pump sources in which a first pump source is arranged to counter-pump the first amplifier stage and the second amplifier stage, and a second pump source is arranged to co-pump one of the first amplifier stage and the second amplifier stage.

18. An optical repeater for a submarine communications system comprising an optical amplifier according to claim 15.

19. A submarine communications system comprising at least one optical repeater according to claim 18.

20. An optical amplifier for a wavelength division multiplexed communications system comprising:
   a first amplifier stage responsive to changes in gain to cause a wavelength dependent gain tilt in one direction;

a second amplifier stage responsive to corresponding changes in gain to cause a wavelength dependent gain tilt in an opposite direction; and, a gain controller controlling the gain of the first and second amplifier stages to maintain a substantially flat response for the amplifier in which the first amplifier stage is a length of optical transmission fibre providing a Raman amplifier and the second amplifier stage is an Erbium Doped Fibre Amplifier, the gain control means comprising a signal processing circuit coupled to an output of the optical amplifier and arranged to detect changes in the output level of the amplifier, a first pump source for providing pump light, the power of the pump light being determined in dependence on the output level of the amplifier, an optical splitter arranged to couple a predetermined proportion of the pump light to the first amplifier stage thereby causing a wavelength dependent gain tilt in a first direction and a predetermined proportion of the pump light to the second amplifier stage thereby causing a wavelength dependent gain tilt in an opposite direction and a second pump source for providing pump light, the first pump source being arranged to counter-pump the first amplifier stage and the second amplifier stage, and the second pump source being arranged to co-pump one of the first amplifier stage and the second amplifier stage.

21. An optical amplifier according to claim 20, in which the signal processing circuit comprises a pump control circuit arranged in a negative feedback control loop around at least one amplifier stage, such that when a decrease in output level of the amplifier is detected the gains of the first amplifier stage and the second amplifier stage are adjusted accordingly to maintain the output of the amplifier at a substantially constant level.

22. An optical repeater for a submarine communications system comprising an optical amplifier according to claim 20.

23. A submarine communications system comprising at least one optical repeater according to claim 22.

* * * * *